United States Patent
Ball et al.

(10) Patent No.: US 9,185,154 B2
(45) Date of Patent: Nov. 10, 2015

(54) INTEGRATED CALL CAPTURE FOR STREAMING AUDIO

(75) Inventors: Simon Ball, Carlisle, MA (US); Carsten Hauser, Langenzenn (DE)

(73) Assignee: Nasdaq, Inc., New York, NY (US)

( * ) Notice: Subject to any disclaimer, the term of this patent is extended or adjusted under 35 U.S.C. 154(b) by 0 days.

(21) Appl. No.: 13/334,868

(22) Filed: Dec. 22, 2011

(65) Prior Publication Data

US 2013/0283160 A1    Oct. 24, 2013

Related U.S. Application Data

(63) Continuation-in-part of application No. 13/211,831, filed on Aug. 17, 2011.

(51) Int. Cl.
| | |
|---|---|
| G06F 3/00 | (2006.01) |
| H04L 29/06 | (2006.01) |
| H04N 21/233 | (2011.01) |
| G06F 3/01 | (2006.01) |
| H04M 3/56 | (2006.01) |
| H04N 21/647 | (2011.01) |

(52) U.S. Cl.
CPC .............. *H04L 65/60* (2013.01); *H04L 65/103* (2013.01); *H04L 65/1069* (2013.01); *H04L 65/605* (2013.01); *H04L 65/607* (2013.01); *H04N 21/233* (2013.01); *H04M 3/56* (2013.01); *H04N 21/64738* (2013.01); *H04N 21/64784* (2013.01)

(58) Field of Classification Search
CPC .......... H04N 5/44543; H04N 21/4622; H04N 21/47; G11B 27/34; G11B 27/034
USPC ........................................................ 715/716
See application file for complete search history.

(56) References Cited

U.S. PATENT DOCUMENTS

| | | | |
|---|---|---|---|
| 6,760,916 B2 * | 7/2004 | Holtz et al. ..................... | 725/34 |
| 6,934,279 B1 | 8/2005 | Sollee et al. | |
| 7,158,539 B2 | 1/2007 | Zhang et al. | |
| 7,552,228 B2 * | 6/2009 | Parasnis et al. ............... | 709/231 |
| 7,640,303 B2 | 12/2009 | Blumofe | |
| 7,904,321 B2 * | 3/2011 | Moore et al. .................. | 705/7.18 |
| 7,937,487 B2 | 5/2011 | Dunbar et al. | |
| 7,987,492 B2 * | 7/2011 | Liwerant et al. .............. | 725/115 |
| 8,307,273 B2 * | 11/2012 | Pea et al. ....................... | 715/201 |
| 8,332,688 B1 * | 12/2012 | Tompkins ....................... | 714/13 |
| 8,424,022 B2 | 4/2013 | Stokes et al. | |

(Continued)

OTHER PUBLICATIONS

H. Andres Lagar-Cavilla, et al., SnowFlock: Virtual Machine Cloning for Cloud Computing, presented at EuroSys 2009 Conference, Nuremberg, Germany, Apr. 1-3, 2009.

(Continued)

*Primary Examiner* — Nicholas Augustine
(74) *Attorney, Agent, or Firm* — Nixon & Vanderhye P.C.

(57) ABSTRACT

Systems and techniques for capturing audio and delivering the audio in digital streaming media formats are disclosed. Several aspects of the systems and techniques operate in a cloud computing environment where computational power is allocated, utilized, and paid for entirely on demand. The systems and techniques enable a call to be made directly from a virtual machine out to a Public Switch Telephone Network (PSTN) via a common Session Interface Protocol (SIP) to PSTN Breakout service, and the audio to be delivered onward to one or more Content Delivery Network (CDN). An audio call capture interface is also provided to initiate and manage the digital streaming media formats.

60 Claims, 12 Drawing Sheets

(56) References Cited

U.S. PATENT DOCUMENTS

| | | | |
|---|---|---|---|
| 8,433,050 B1* | 4/2013 | Baten et al. | 379/202.01 |
| 8,531,447 B2* | 9/2013 | Walker et al. | 345/418 |
| 2007/0242626 A1* | 10/2007 | Altberg et al. | 370/259 |
| 2007/0300165 A1* | 12/2007 | Haveliwala | 715/758 |
| 2008/0126943 A1* | 5/2008 | Parasnis et al. | 715/730 |
| 2008/0311888 A1 | 12/2008 | Ku et al. | |
| 2009/0164876 A1* | 6/2009 | Logan et al. | 715/201 |
| 2009/0300143 A1* | 12/2009 | Musa et al. | 709/218 |
| 2011/0225513 A1* | 9/2011 | Lauwers et al. | 715/756 |
| 2012/0284632 A1* | 11/2012 | Baird | 715/749 |
| 2012/0317299 A1 | 12/2012 | Sathianathan et al. | |
| 2012/0331406 A1* | 12/2012 | Baird et al. | 715/760 |

OTHER PUBLICATIONS

U.S. Appl. No. 13/211,831, filed Aug. 17, 2011; Inventor: Ball et al.
Office Action mailed Sep. 3, 2013 in U.S. Appl. No. 13/211,831.
H. Andres Lagar-Cavilla et al., SnowFlock: Virtual Machine Cloning for Cloud Computing, presented at EuroSys 2009 Conference, Nuremburg, Germany, Apr. 1-3, 2009.

* cited by examiner

302 — Filter

Date/Time: [Tomorrow ▽]  Start After: [ / / ]  End Before: [ / / ]  Operator: [Any ▽]  Shift: [Shift 2 ▽]  [Organize Mode] [Monitor Mode]

312 — Time Management, Monday 13th of September 2010

| time | 02:00 | 02:15 | 02:30 | 02:45 | 03:00 | 03:15 | 03:30 | 03:45 | 04:00 | 04:15 | 04:30 | 04:45 | 05:00 | 05:15 | 05:30 | 05:45 | 06:00 |
|---|---|---|---|---|---|---|---|---|---|---|---|---|---|---|---|---|---|
| starting events | 7 | 0 | 20 | 90 | 10 | 100 | 15 | 130 | 0 | 70 | 0 | 0 | 10 | 0 | 15 | 0 | 0 |
| running events | 5 | 12 | 12 | 92 | 58 | 48 | 130 | 130 | 100 | 70 | 70 | 0 | 0 | 10 | 8 | 23 | 0 |
| ending events | 3 | 0 | 5 | 5 | 20 | 0 | 18 | 0 | 90 | 0 | 23 | 10 | 9 | 0 | 2 | 0 | 29 |
| needed operators | 3 | 1 | 7 | 12 | 15 | 30 | 23 | 19 | 20 | 10 | 10 | 10 | 10 | 1 | 5 | 2 | 8 |
| avail. Operators | 10 | 10 | 10 | 10 | 10 | 10 | 10 | 10 | 10 | 10 | 10 | 10 | 10 | 10 | 10 | 10 | 10 |
| overcapacity | 7 | 9 | 3 | -2 | -5 | -20 | -13 | -9 | -10 | 0 | -13 | 0 | 0 | 9 | 5 | 8 | 2 |
| Peter Mueller (S2) | | | | | | | | | | | | | | | | | |
| Susanne Giehl (S2) | | | | | | | | | | | | | | | | | |
| Klaus Stahl (S2) | | | | | | | | | | | | | | | | | |
| Katrin Meier (S2) | | | | | | | | | | | | | | | | | |
| Andre Lammel (S2) | | | | | | | | | | | | | | | | | |
| Ernie Walter (S2) | | | | | | | | | | | | | | | | | |
| Gabi Dohm (S2) | | | | | | | | | | | | | | | | | |
| Jens Zahn (S2) | | | | | | | | | | | | | | | | | |
| Andreas Himmler (S2) | | | | | | | | | | | | | | | | | |
| Sven Zipelski (S2) | | | | | | | | | | | | | | | | | |

306 — Chat

Peter Mueller \ Susanne Giehl \ Klaus Stahl \ Katrin Meier \ chat to all

Peter > Hello Carsten...
Carsten > Hello Peter

[set status ▽]

| Status | Operator | No. of Events |
|---|---|---|
| online | Peter Mueller | 3/5 |
| online | Susanne Giehl | 4/6 |
| away | Klaus Stahl | 2/3 |
| offline | Katrin Meier | 0/5 |

INTEGRATED CALL CAPTURE FOR STREAMING AUDIO

CROSS-REFERENCE TO RELATED APPLICATION

This application is a continuation-in-part of U.S. application Ser. No. 13/211,831, filed Aug. 17, 2011 entitled "SCALABLE TRANSCODING FOR STREAMING AUDIO", the contents of which are all incorporated herein in their entirety,

TECHNICAL FIELD

This disclosure relates generally to streaming data, and more particularly to scalable transcoding for streaming audio.

BACKGROUND

Generally, a communications platform that transforms audio into an integrated streaming audio webcast is known in the art. End-users are able to participate in the audio webcasts from anywhere on the Internet using just a standard web browser, with the audio being streamed to the user. Streaming media is a type of Internet content that can be played while still in the process of being downloaded. A user's computer can play a first packet of an audio stream, decompress a second packet, while receiving a third packet. As such, an end-user can listen to a webcast without waiting until the end of content transmission. Streaming media quality can vary widely according to the type of media being delivered, the speed of the user's Internet connection, network conditions, content encoding, and the format used.

Typically, the media's server, client, and production and encoding tools developed by a streaming software vendor are collectively referred to as a format. Streaming media encoded in a particular format is provided by that format's media server and can be replayed using that format's client. Media clients are also often referred to as 'players', and typically exist as plug-ins to Web browsers. Example common streaming formats include, but are not limited to, Windows Media (WMS), Real and Apple QuickTime.

In the prior art, an audio webcast is typically setup as shown in FIG. 1. At step 10, a customer wishing to initiate a webcast contacts a call provider to schedule an event. At step 12, the call provider, who typically operates an event registration system for scheduling the event, enters the event information into the registration system. Then, at step 14, the call provider confirms the event information and sends the customer a provider Web site address, an event identifier, and a user name and password to use to initiate the conference call. At step 15, either the vendor and/or call provider transmits invitation messages to prospective end-users. The messages are typically included in an e-Mail and include the event identifier sent to the customer, as well as a link to a content distribution Web site. At step 16, the prospective end-users receive the notification. Lastly, at step 18, to access the event, an end-user selects the link included in the e-Mail (or enters a URL manually) to launch his or her browser's media player to listen to the event. To connect and listen to an event, the end-user typically requires a computer having with a hardware sound card and Internet connection, an Internet browser (Internet Explorer or Netscape Navigator, or the like), streaming media player (e.g., Windows Media Player, RealPlayer or the like) and the Web site address of the event. At the Web site address of the event, the end-user may enter the event identifier, user name (if required) and password (if required) to access the event. Of course, one or more of the above-described steps can be carried out in a different manner.

Traditional webcast systems have several deficiencies. For example, these systems typically operate on a single computer server, which represents a single point of failure and limits scalability, i.e., the number of users that can listen to the audio of the event. Moreover, the prior art systems require advanced setup for the content streams requiring a significant investment in both computer and telephony infrastructure equipment. Such systems and resources required include, without limitation, racks of telephony equipment, media encoders, storage, network connectivity, and the like. Moreover, this infrastructure is required to be maintained twenty four (24) hours, seven (7) days a week for three hundred and sixty five (365) days in readiness for service. Furthermore, the capacity of this infrastructure needs to exceed the highest possible peak of demand, even if average demand only utilizes a fraction of the equipment. As a consequence, prior art webcast systems require physical production facilities that have inherent cost and scaling issues.

These and other problems of prior art webcast systems are addressed by the present invention.

SUMMARY

Systems and techniques for capturing audio and delivering the audio in digital streaming media formats are disclosed. Several aspects of the systems and techniques operate in a cloud computing environment where computational power is allocated, utilized, and paid for entirely on demand. The systems and techniques enable a call to be made directly from a virtual machine out to a Public Switch Telephone Network (PSTN) via a common Session Interface Protocol (SIP) to PSTN Breakout Service, and the audio to be delivered onward to one or more Content Delivery Network (CDN). An audio call capture interface is also provided to initiate and manage the digital streaming media formats.

Various aspects of the invention relate to streaming and encoding audio using a cloud computing environment. For example, according to one aspect, a method of streaming information includes establishing a set of connections between a first PSTN breakout service and a set of machines. A first machine in the set of machines is a first virtual machine instantiated in a first cloud computing environment, the first PSTN breakout service being connected to a conference call. The method also includes receiving a digital data stream in at least one machine in the set of machines, the digital data stream having been encoded according to a first encoding protocol, encoding the digital data stream to generate an encoded digital data stream, the encoding being done according to a second encoding protocol, and transmitting the encoded digital data stream to a content delivery network (CDN).

In one embodiment, the method includes receiving the digital data stream over one of the set of connections between the first PSTN service and the first virtual machine, encoding the digital data stream on the first virtual machine, and transmitting the encoded digital data stream from the first virtual machine to the CDN. The method may also include receiving the digital data stream at a second virtual machine, encoding the digital data stream on the second virtual machine, and transmitting the encoded data stream from the second virtual machine to the CDN.

The second virtual machine may be instantiated in the first cloud computing environment or a second cloud computing environment that is different from the first cloud computing environment. In addition, the method may include instantiating the first virtual machine in response to a request from a call control interface module. In one embodiment, the method includes instantiating the second virtual machine from at least one of the call control interface module and the first virtual machine.

In one embodiment, the method includes receiving the digital data stream at the second virtual machine from the first virtual machine. In another embodiment, the method includes receiving the digital data stream at the second virtual machine from the first PSTN breakout service. In yet another embodiment, the method includes receiving the digital data stream from a second PSTN breakout service, the second PSTN breakout service being connected to the conference call.

The method may include transmitting the digital data stream to the second virtual machine from the first PSTN breakout service upon at least one of a failure and delay in one of the data connections between the first data connection and the first virtual machine. The digital data stream may be received using a speech codec. The codec being G.722, G.719 and G.711 compliant.

In one embodiment, the method includes providing a session initiation protocol (SIP) application in each of the first and second virtual machines for receiving and managing the digital data stream in the first encoding protocol, and providing at least one audio encoder for encoding the digital data stream into the second encoding protocol.

The method may also include providing an operating system (OS) audio bus for transmitting the digital data stream in each of the first and second virtual machines, the OS audio bus being a software audio driver. In one embodiment, the software audio driver is a Windows Driver Model (WDM) audio driver. The method may also include encoding the digital data stream into a Windows Media Audio (WMA) file.

The method may further includes providing a plurality of audio encoders for encoding the digital data stream into at least one third encoding protocol different from the first encoding protocol and the second encoding protocol, encoding the digital data stream using the third encoding protocol, and transmitting the encoded digital data stream according to the third protocol to the CDN. In one embodiment, a first encoder of the plurality of audio encoders is a Windows Media encoder and a second encoder of the plurality of audio encoders is a Flash Media encoder. The method may also include encoding the digital data stream into a Flash Media audio file.

The method may also include providing an audio server in each of the first and second virtual machines, the audio server transmitting the encoded digital data stream to the CDN. In one embodiment, the audio server is a flash media server and the encoded digital data stream is a flash media file.

In yet another embodiment, the method further includes generating, from the SIP Application, an MP3 audio file from the received digital data stream in the first encoding format, and storing the MP3 audio file in a data store associated with each of the first and second virtual machines. The method may further include scrubbing the MP3 audio file.

Systems, methods, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

FIGS. 7-8 illustrate an example supervisor interface in time management mode.

Like reference symbols in the various drawings indicate like elements.

DETAILED DESCRIPTION

Figure 1:
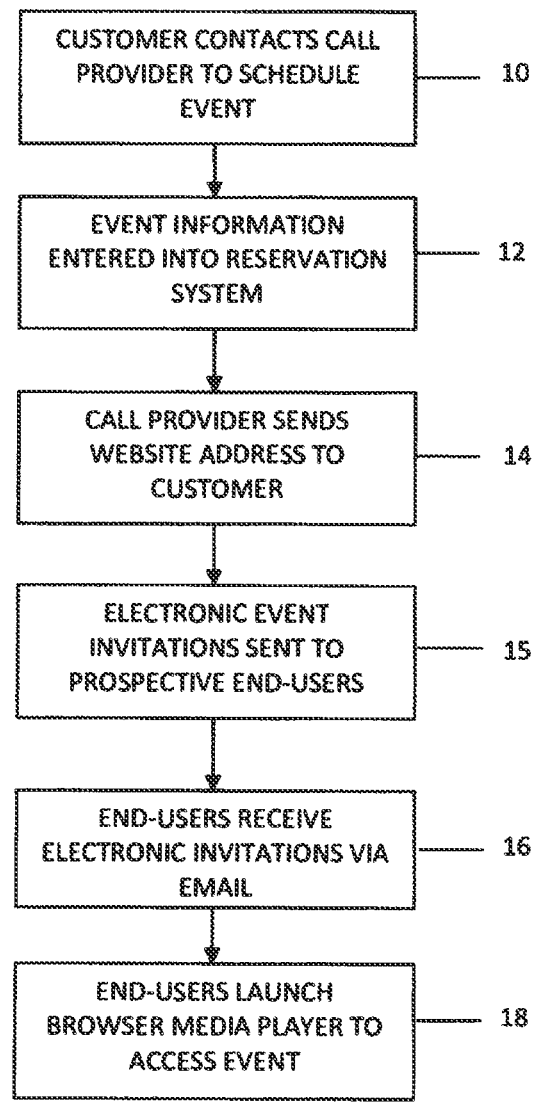
FIG. 1 is an example method of initiating and conducting an audio conference cast in accordance with the prior art.
Figure 2:
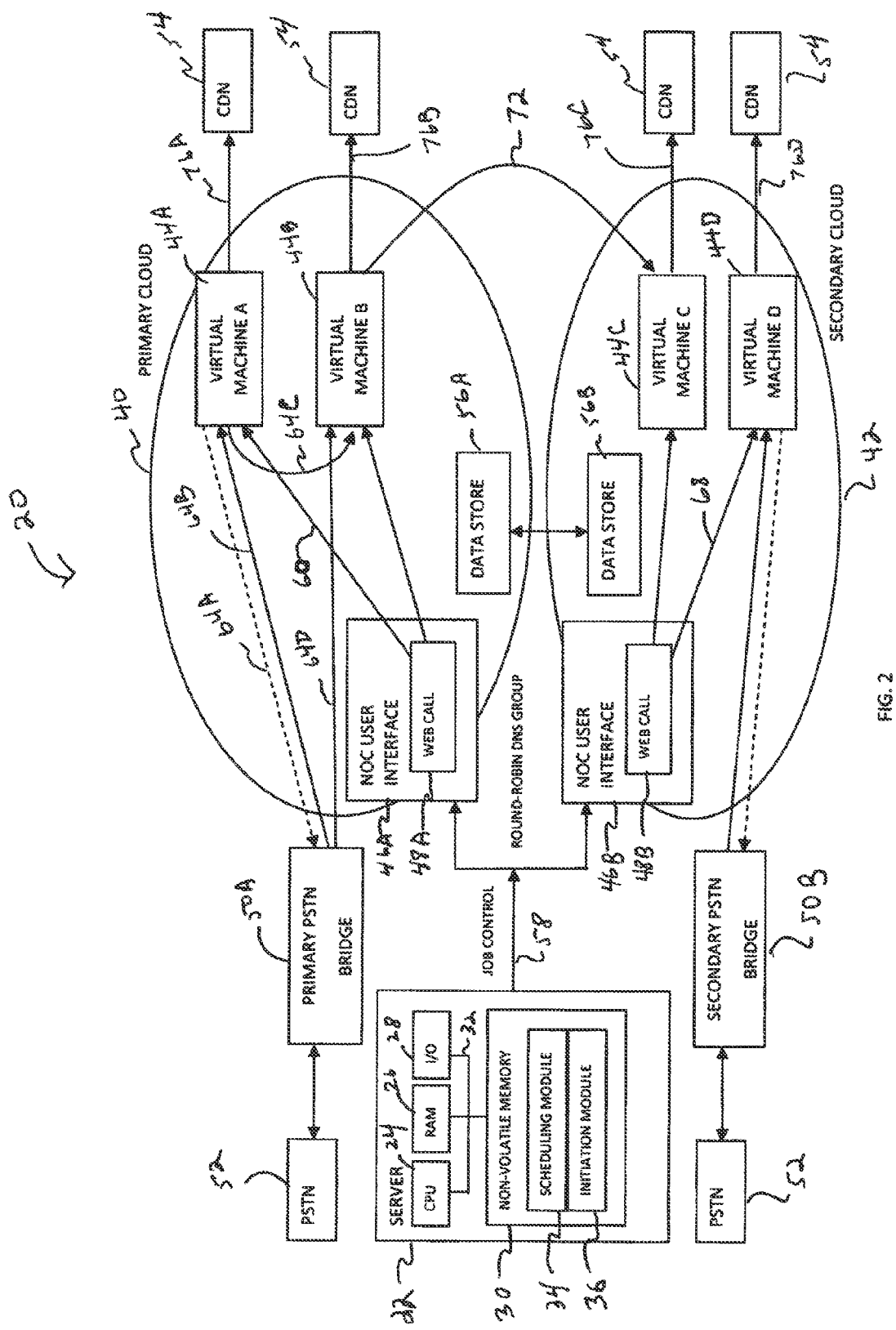
FIG. 2 is a schematic of an example transcoding system according to one embodiment of the present invention.

Turning now to FIG. 2, an example of a suitable computing system 20 for capturing conference call audio via a Public Switch Telephone Network (PSTN) 52 and delivering the conference call audio in streaming media formats to one or more content distribution networks (CDN) 54 is disclosed. The computing system 20 is only one example and is not intended to suggest any limitation as to the scope of use or functionality of the invention. Neither should the computing system 20 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

As shown in the FIG. 2 example, the system 20 includes a server device 22 configured to include a processor 24, such as a central processing unit ('CPU'), random access memory ('RAM') 26, one or more input-output devices 28, such as a display device (not shown) and keyboard (not shown), and non-volatile memory 30, all of which are interconnected via a common bus 32 and controlled by the processor 24.

In one embodiment, the server device 22 is in operative communication with a plurality of cloud computing environments 40, 42 each configured with a plurality of virtual machines 44A-D. The server device 22 provides a control plane 58 (e.g., job control) and includes a scheduling module 34 that is used to schedule events, such as audio conference calls, and an initiation module 36 for instantiating the virtual machines 44A-D, network operation center (NOC) user interfaces 46A, 46B, and data stores 56A, 56B in each cloud environment 40, 42.

The data stores 56A, 56B shown in FIG. 2 are a repository that stores state information concerning each virtual machine 44A-D, respectively, operating in each respective cloud environment 40, 42. In one embodiment, the data stores 56A, 56B are relational databases configured in each cloud computing environment 40, 42. Database replication is implemented across each of the databases 56A, 56B. In another embodiment, the data stores 56A, 56B are directory servers, such as a Lightweight Directory Access Protocol ('LDAP') that are replicated across each cloud computing environment 40, 42. In yet another embodiment, the data stores 56A, 56B 34 are an area of non-volatile memory 30 of the server device 22 that are replicated.

As known in the art, cloud computing environments provide ubiquitous, convenient, on-demand network access to a shared pool of configurable computing resources (e.g., networks, servers, storage, applications, and services) that can be rapidly provisioned and released with minimal management effort or service provider interaction. Accordingly, each of the cloud computing environments 40, 42 shown in FIG. 2 provide computational power that can be supplied, utilized, and paid for entirely on demand. Although there are only two cloud computing environments 40, 42 shown in the FIG. 2 schematic, it will be appreciated by one skilled in the art that the present invention is not limited to using two cloud computing environments 40, 42 and may utilize one or more cloud computing environments. Advantageously, by utilizing a plurality of cloud computing environments, as shown in the FIG. 2 example, additional system redundancy and resiliency may be achieved. By way of example and in no manner limiting, example cloud computing environments used with the present invention may include Amazon EC2®, Rackspace® and GoGrid®.

Each of the NOC user interfaces 46A, 46B includes a web call module 48A, 48B, respectively, that provides management and control of the virtual machines 44A-D. As shown in the FIG. 2 example, in one embodiment, the NOC user interfaces 46A, 46B are distributed across a number of virtual machines and clouds sharing a same Domain Name system (DNS). Advantageously, by distributing the NOC user interfaces 46A, 46B across virtual machines sharing the same DNS, a round-robin technique of data store updates may be achieved. For example, if during an audio webcast one of the virtual machines processing the audio becomes unreachable, connections to a next internet protocol (IP) address in a DNS list of the DNS may be made resulting in increased resiliency of the system. In addition, in one embodiment, each call module 48A, 48B implements database replication of the data stores 56A, 56B to ensure that whichever virtual machine assumes audio webcast processing, all virtual machines of the system receive the instructions that have been sent over the job control signal 58 and have information concerning the state of all virtual machines in the cloud environments 40, 42. Advantageously, by utilizing this technique, any of the web call modules 48A, 48B and/or cloud environments 40, 42 may be impaired or disabled with minimal or no interruption of scheduled or active conference webcasts.

For example, referring to the primary cloud environment 40 of FIG. 2, the call module 48A transmits a signal 60 to 'Virtual Machine A' 44A to dial a Primary Public Switch Telephone Network (PSTN) bridge 50 (e.g. a PSTN Breakout Service) to connect to the PSTN 50. Example PSTN Breakout Services include, but are not limited to, SiPGate®, VoIP-Talk™, and VoIPfone™. The Primary PSTN bridge 50 dials out 64A to the PSTN 50 and returns a SIP audio signal 64B to the Virtual Machine A 44A. The Virtual Machine A 44A in turn transmits the received audio signal in a streaming encoded format via a signal 76A to the content delivery network (CDN) 54. In one embodiment, as discussed in connection with FIG. 3 below, the Virtual Machine A 44A is configured to include a PSTN Bridge/Session Initiation Protocol (SIP) client that, as shown in FIG. 2 via signal 64C, relays the received audio signal to 'Virtual Machine B' 44B. Virtual Machine B 44B may then encode and stream the received audio signal in an encoded format via a signal 76B to the CDN 54. In the event there is a problem with Virtual Machine A, the PSTN Bridge 50 automatically transmits the SIP audio signal 64D to Virtual Machine B 44B, which continues to transmit the encoded audio signal to the CDN 54.

In one embodiment, if there is a performance issue with the primary cloud environment 40, Virtual Machine B 44B transmits a relay signal 72 of the received audio signal to 'Virtual Machine C' 44C in the secondary cloud computing environment 42. Virtual Machine C 44C then processes the audio signal in a manner similar to Virtual Machine B 44B and transmits/streams the encoded audio signal to the CDN 54.

As shown in the FIG. 2 example, in one embodiment, to further ensure system availability if there are performance issues with the primary cloud environment 40, the web call module 48B of the secondary cloud computing environment 42 transmits a signal 68 to 'Virtual Machine D' 44D to dial a Secondary Public Switch Telephone Network (PSTN) bridge 50B to connect to the PSTN 50 with the resulting audio being made available to the CDN 54 as a third, completely discrete path available as soon as the NOC User Interface 46B connects the audio conference call to the source conference call.

Advantageously, the system 20 provides failover safety if 1) Virtual Machine A 44A fails to maintain a conference call, 2) the primary cloud environment 40 and/or Virtual Machine A 44A have fail or have performance issues, and 3) the signal 64C is not transmitted from Virtual Machine A 44A to Virtual Machine B 44B. In particular, if any of the before-mentioned situations occur, local failover to Virtual Machine B 44B occurs quickly ensuring there is a continuous audio source. In addition, the relay signal 72 transmitted from Virtual Machine B 44B to Virtual Machine C 44C ensures that a second virtual machine in a second cloud computing environment is activated, reducing the risk that faulty clouds may cause an outage.

Moreover, by Virtual Machine D 44D initiating a second call through the Secondary PSTN Bridge 50B, additional redundancy and resiliency may be achieved. While the NOC User Interface 46B may need to clear security to join the conference call on the PSTN 50, which may take a few minutes, this action is initiated as soon as Virtual Machine C 44C is activated as a backup to Virtual Machine B 44B. As such, should Virtual Machine A 44A have failed because the primary cloud environment 40 is failing, by the time Virtual Machine B 44 fails to transmit the signal 72 to Virtual Machine C 44C, Virtual Machine D 44D is already active and streaming an encoded audio stream signal 76D to the CDN 54, which may be included as an alternative option in a CDN playlist.

Figure 3:
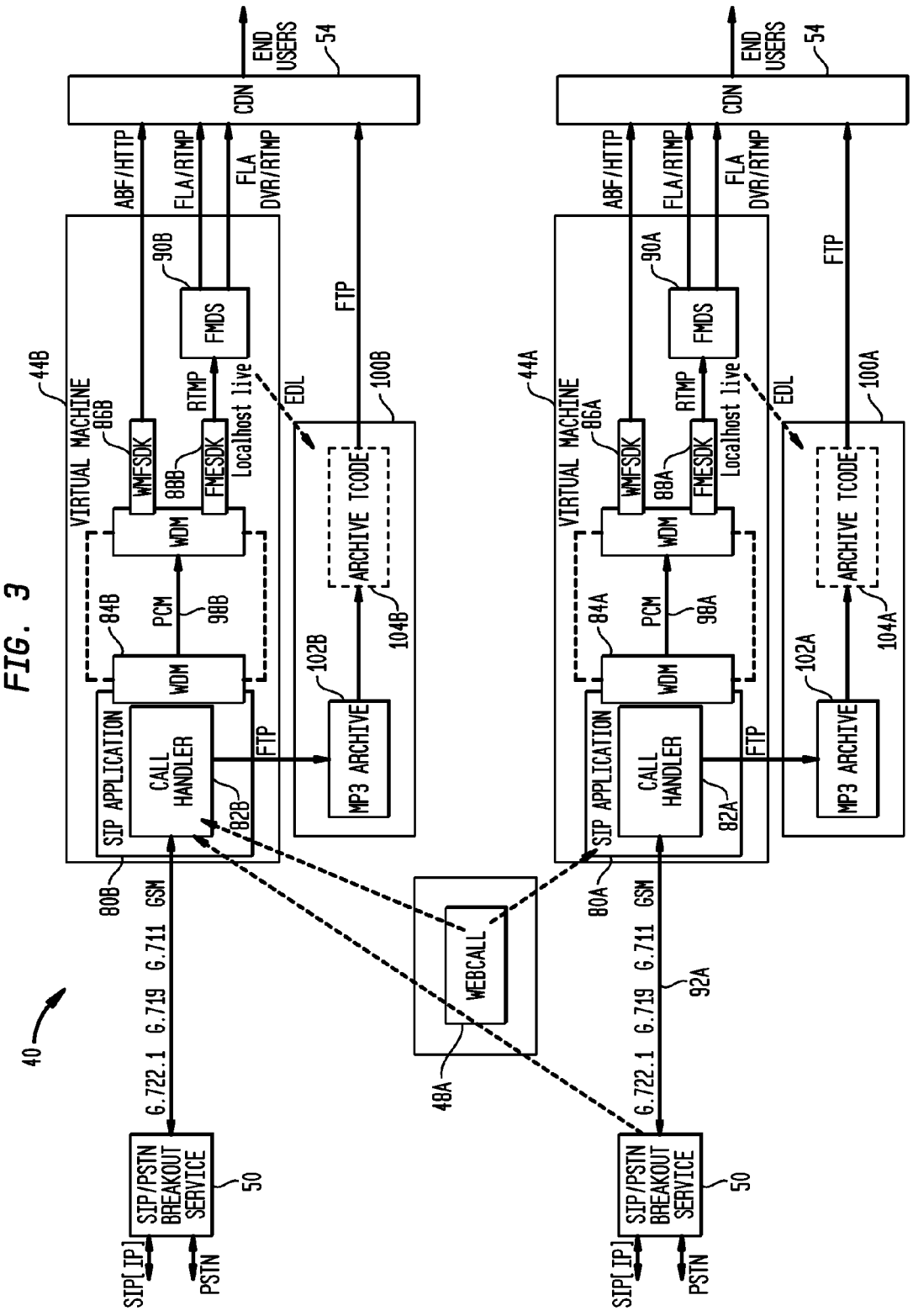
FIG. 3 is a schematic of virtual machines included in the example transcoding system of FIG. 2.

Turning now to FIG. 3, a schematic of component modules included in the primary cloud environment 40 of FIG. 2 is disclosed. As shown in the FIG. 3 example, in one embodiment, a plurality of clone (e.g., replica) virtual machines, indicated by Virtual Machine A 44A and Virtual Machine B 44B, are instantiated by a web call module 48A in the primary cloud environment 40. Initially, the plurality of virtual machines 44A, 44B shares the same initial state.

Each virtual machine 44A, 44B is configured to include a Session Initiation Protocol (SIP) Application 80A, 80B each having a call handler module 82A, 82B, respectively, that is configured to dial a PSTN Breakout Service 50. As known in the art, a PSTN Breakout Service provides a platform for transporting Voice over Internet Protocol (VoIP) media between IP networks and a PSTN. In one embodiment, as shown in FIG. 3, Virtual Machine A 44A establishes a communication signal 92A with the PSTN Breakout Service 50 to dial the PSTN 50 to join a conference call. An audio signal of the conference call is then transmitted back to Virtual Machine A 44A over the communication signal 92A. As discussed previously, Virtual machine A 44 may also transmit the received audio signal to Virtual Machine B 44B which in turn, transmits an encoded audio stream to the CDN 54. Example communication protocols used for receiving and transmitting audio signals between each call handler 82A, 82B and the PSTN Breakout Service 50 may include, but are not limited to, G.722, G.719, G.711, and GSM.

In one embodiment, each of the call handler modules 82A, 82B, upon receiving the digital audio signals, compress the sound sequence included therein into a digital audio encoding format. In one embodiment, the digital audio encoding format uses a form of lossy data compression, such as an MP3 encoding format. Each call handler module 82A, 82B then transmits each respective MP3 encoded format file to a data store 100A, 100B in the primary cloud 40 using file transfer protocol (FTP). In one embodiment, an audio scrub module (not shown) is provided that may be applied to the MP3 file to improve the quality of the audio file. Upon completion of the conference call and/or audio file scrubbing, as shown in FIG. 3, each MP3 encoded format file 102A, 102B may be archived 104A, 104B and then transmitted via a signal 114A, 114B to the CDN 54 using FTP.

In one embodiment, as shown in the FIG. 3 example, each Virtual Machine 44A, 44B may be configured to include a Windows Driver Model (WDM) audio device driver 84A, 84B. Each WDM audio device driver 84A, 84B is configured to operate as an Operating System (OS) audio bus that provides audio converter and splitter functionality resulting in an audio card simulation in each Virtual Machine 44A, 44B. As shown in the FIG. 3 example, the received digital audio signal may be encoded into an uncompressed audio format 98A, 98B, such as PCM.

Each of uncompressed audio formats 98A, 98B may be then provided to Windows Media Format Software Development Kit (WMFSDK) encoders 86A, 86B, included in each Virtual Machine 44A, 44B. The WMFSDK encoders 86A, 86B encode the uncompressed audio into an Advanced Systems Format (ASF) and transmit/stream the encoded files via a signal 106A, 106B to the CDN 54 using Hypertext Transfer Protocol (HTTP). As shown in the FIG. 3 example, each Virtual Machine 44A, 44B may also include a Flash Media Encoder Software Development Kit (FMESDK) 88A, 88B for encoding the uncompressed audio format into an encoded flash audio format. In one embodiment, output audio streams from each FMESDK 88A, 88B are transmitted to a Flash Media Development Server (FMDS) 90A, 90B via a Real Time Messaging Protocol (RTMP) (e.g., a protocol developed by Adobe Systems, Incorporated, for streaming audio and other types of media). Each FMDS 90A, 90B then streams the flash encoded audio formats to the CDN 54 using RTMP and RTMP digital video record (DVR) techniques.

Figure 4:
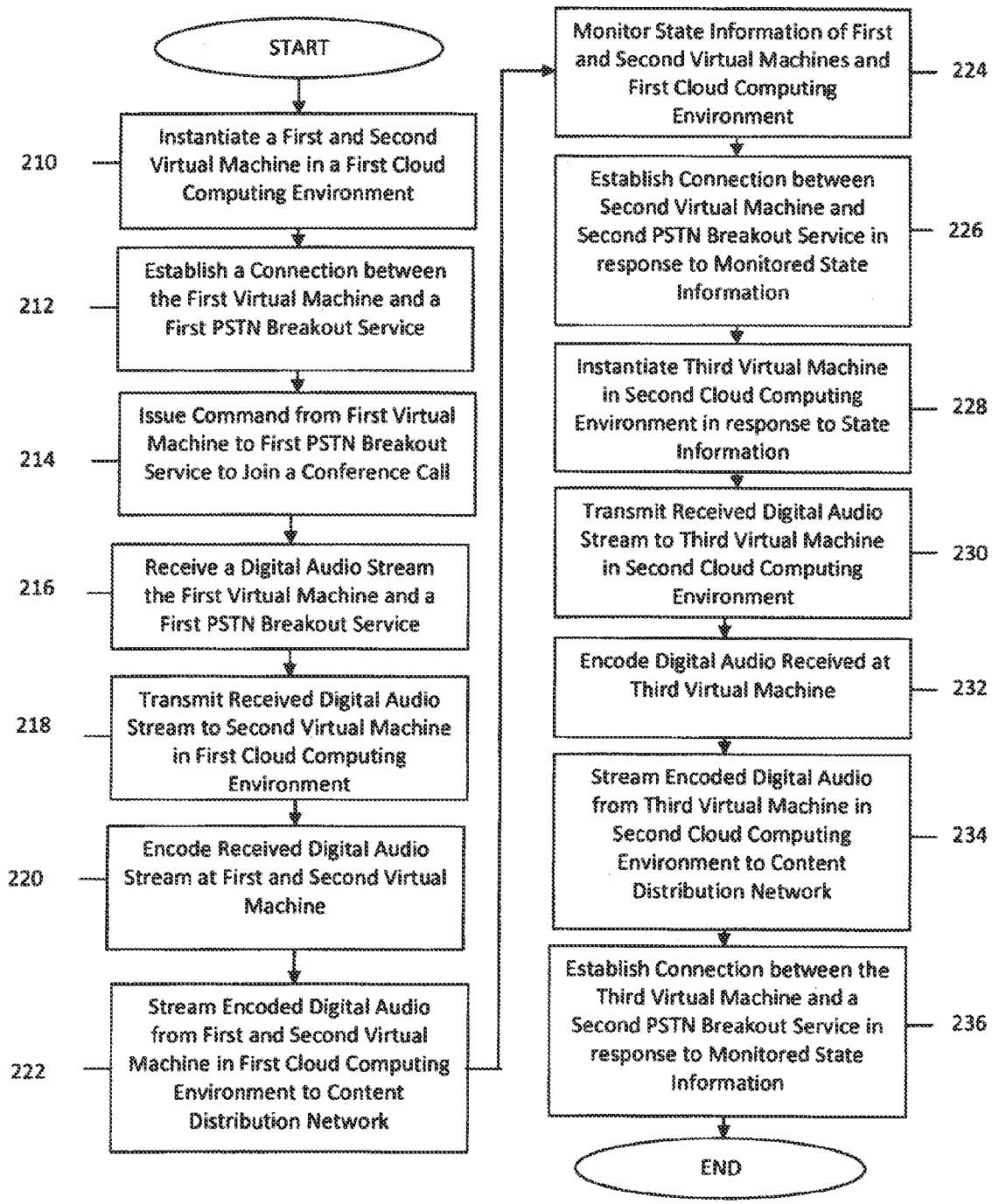
FIG. 4 illustrates an example method of capturing conference call audio and delivering the conference call audio in streaming media formats according to one embodiment of the present invention.

Turning now to FIG. 4, an example method of capturing conference call audio and delivering the conference call audio in streaming media formats. First, at step 210, a first and second virtual machine is instantiated in a first cloud computing environment by the webcall module of the NOC interface. Next, at step 212, a call handler module of a SIP application included in a first virtual machine establishes a connection to a first PSTN Breakout Service. Next, at step 114, the call handler module issues a command to the PSTN Breakout Service to join a conference call. Once the first PSTN Breakout Service joins the conference call, at step 216, the call handler module receives a digital audio stream of the conference call. At step 218, the first virtual machine then relays the received digital audio stream to the second virtual machine. The first and the second virtual machine, at step 220, encode the received digital audio and at step 222, and stream the encoded digital audio in various media formats to a CDN for playing in a browser by an end user. In one embodiment, the encoded media formats include, but are not limited to, a Windows Media Audio format, a Flash Audio format, and a MP3 audio format.

As described previously, in one embodiment, each call handler module in response to receiving the digital audio from the PSTN Breakout Service may generate and transmit a MP3 encoded format file to a data store using file transfer protocol (FTP). The MP3 file may then be scrubbed by an audio scrub module to improve the quality of the audio file. Upon completion of the conference call and/or audio file scrubbing, the MP3 encoded format file may be archived and then transmitted via a signal to the CDN using FTP.

In one embodiment, at step 224, the method includes monitoring state information of the first and second virtual machine, as well as the first cloud computing environment. The state information may relate to processing throughput. In the event of a delay or failure associated with the first virtual machine or first PSTN Breakout Service, at step 226, the second virtual machine may establish a connection with a second PSTN Breakout Service to join the conference call, receive and encode the digital audio, and continue streaming the encoded digital stream to the CDN.

At step 228, the method may include the webcall module instantiating a third virtual machine in a second cloud computing environment in response to state information associated with either the first virtual machine, second virtual machine, or first cloud computing environment. Of course, and as discussed previously, additional virtual machines may be established in either the first or second cloud computing environments and the present invention is not limited to the number of virtual machines depicted or described in FIGS. 2-4. In the event a third virtual machine is instantiated in the second cloud computing environment, at step 230, either the first or second virtual machine may transmit their received digital audio stream to the third virtual machine. At step 232, the third virtual machine encodes the received digital audio and at step 234, streams the encoded digital audio from the third machine in the second cloud computing environment to the CDN. In one embodiment, at step 236, the third virtual machine may also establish a connection with a second PSTN Breakout Service to receive the digital audio and transmit the received digital audio to additional virtual machines for added system redundancy and resiliency.

Referring now to FIGS. 5-12, additional details of a NOC user interface of the present invention are disclosed. The NOC user interface may be used to mange a set of scheduled audio webcasts and to configure and deliver encoding for the set of audio webcasts using at least one virtual machine in the cloud computing environment. In one embodiment, the NOC user interface provides data entry capability for scheduling an audio webcast.

The NOC user interface allows one or more operators to dial into telephone conferences and to connect to virtual encoders that produce data streams for webcast players. As shown and described in connection with FIGS. 9-12, one or more webcast players are provided in browser-based interfaces of the NOC interface and are associated with scheduled audio webcasts. Advantageously, use of the NOC interface enables production of audio webcasts in a virtual environment without the need for a physical encoding center in the same location.

For explanatory purposes only, the following roles are utilized to describe functions performed by users that may employ the NOC user interface 300. A "Supervisor" role refers to the individual responsible for organizing the workload of a team of webcast operators. Additionally, the Supervisor role is responsible for incident monitoring and overall management of operator team workload. An "Operator" role refers to the individual responsible for processing one or more webcasts from beginning (e.g., signal acquisition) to end (e.g., production of the on-demand version of a webcast). Further, a "Conference Call Operator" role refers to a manager of a telephone conference that may be located at a call center location of a conference call provider.

The NOC user interface 300 includes a plurality of browser-based interfaces that may be utilized by a Supervisor. In one embodiment, the NOC user interface includes a supervisor interface 300 that includes an organization mode, a monitor mode, and a time management mode. For example, turning now to FIG. 5, an example supervisor interface 300 in the organization mode is disclosed. As shown in the FIG. 5 example, in one embodiment, the organization mode of the supervisor interface 300 includes a filter portion 302, an organizer portion 304, and a chat portion 306.

The filter portion 302 provides look-up functionality to search for one or more of the set of scheduled audio webcasts. In one embodiment, look-up functionality is based on selectable search criteria. As shown in the FIG. 5 example, the search criteria may include a selectable date/time criteria 302A allowing a user to specify a time period in which a user may desire to organize and search scheduled webcasts, a start date 302B and end date 302C criteria allowing a user to specify specific dates in which to search and organize scheduled webcasts, and a pull-down list comprising a set of selectable audio webcast operators 302D. The filter portion 302 also includes a pull-down list of selectable audio webcast types 302E, that are described below, a data entry field for specifying an audio webcast identifier 302F associated with each one of the set of scheduled webcasts, and a data entry field for specifying a company name 302G that is associated with one or more of the set of scheduled audio webcasts.

Upon selection of any one of the search criteria, the supervisor interface 300 may arrange the set of scheduled audio webcasts in a calendar portion 304C included in the organizer portion 304 of the interface 300 based on scheduled dates and times associated with each audio webcast. As shown in the FIG. 5 example, a monitor mode button 302H and a time-management button 302I may also be provided that once selected, allows a Supervisor to toggle between the before-mentioned monitor mode and time management mode of the interface 300. Details of the monitor mode and time management mode are discussed in connection with FIGS. 6 and 7, respectively.

The organizer portion 304 of the supervisor interface 300 displays a schedule of all active operators associated with a Supervisor during a particular time frame. As shown in the FIG. 5 example, in one embodiment, the organizer portion 304 includes a webcast list portion 304A and the calendar portion 304C.

The webcast list portion 304A identifies and displays one or more webcasts that are associated with a particular client over a time interval. For example, as shown in FIG. 5, the first webcast 304A1 displayed is associated with a client identified as "Siemens" and is scheduled to occur between 9:00 and 10:00.

Figure 5:
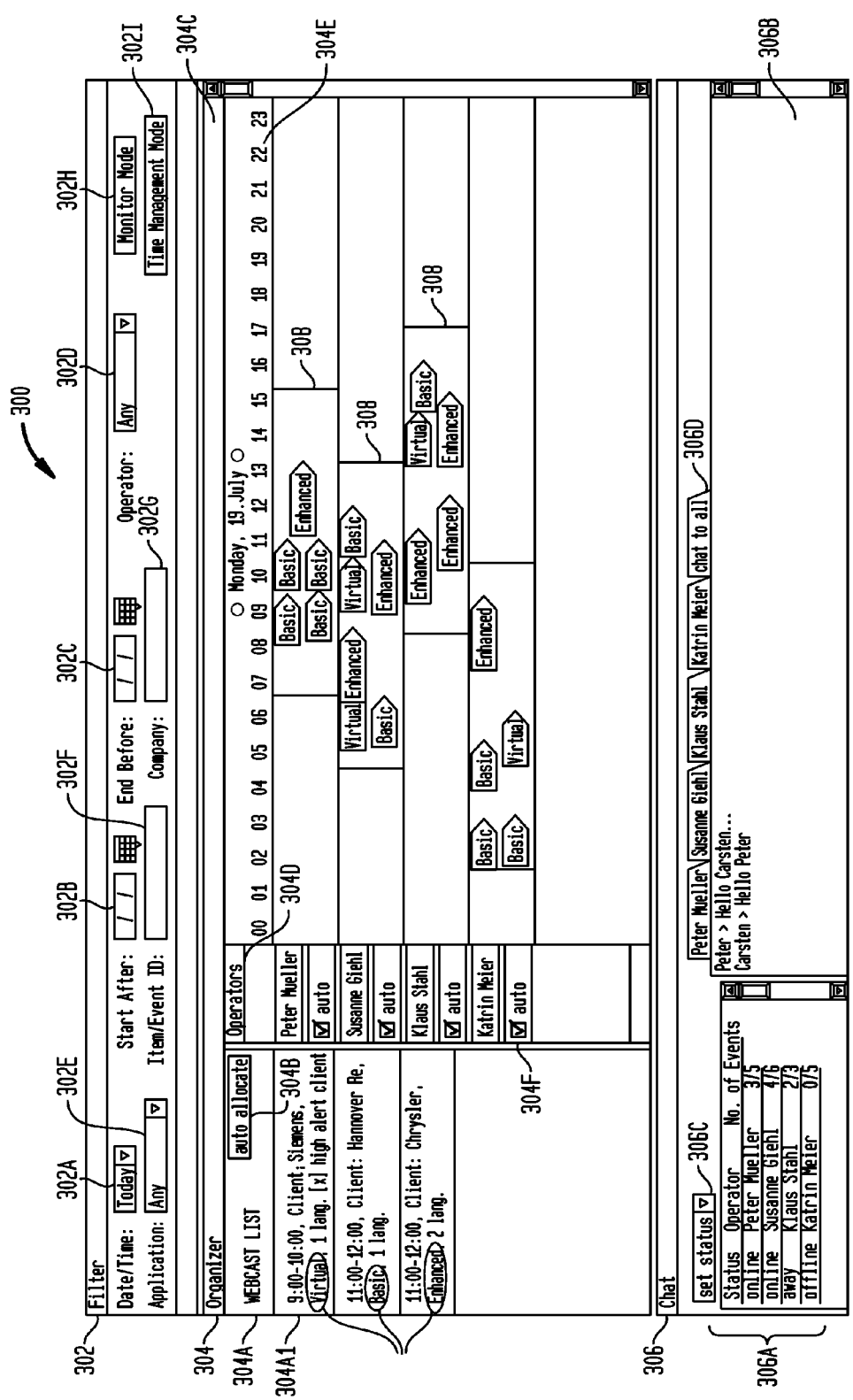
FIG. 5 illustrates an example supervisor interface in organize mode.

As shown in the FIG. 5 example, the webcast list portion 304A includes an auto-allocate button 304B that, once selected, causes the system to automatically assign webcasts to available Operators in a pre-defined team of Operators. In one embodiment, Operator assignment is performed by the system using a round-robin technique. As will be appreciated by one skilled in the art, various other assignment techniques may be utilized by the system for assigning Operators to webcasts.

In one embodiment, for example, the system of the present invention maintains when each Operator may be available to process and audio webcast and ensures that the time in which Operators are assigned does not overlap for more than three (3) scheduled webcasts occurring in parallel over a fifteen (15) minute time interval. The system may also ensure that an Operator does not monitor more than ten (10) scheduled webcasts during any given time interval.

Webcasts identified in the webcast list portion 304A may also be user selectable. For example, in one embodiment, audio webcasts identified in the webcast list portion 304A may be moved using drag and drop functionality to the calendar portion 304C. As such, scheduled audio webcasts may be rescheduled by the Supervisor in a seamless fashion.

Further, the webcast list portion 304A may also display an audio webcast type 304A2 that is associated with each of the set of scheduled audio webcasts. For example, in one embodiment, the audio webcast type may be a "Basic" type, indicating that an audio signal is to be webcast without delivery of any type of slides or presentations accompanying the webcast, an "Enhanced" webcast type indicating that an audio signal is to be webcast with delivery of slides or presentations that are controlled by the Conference Call Operator, and a "Virtual" webcast type indicating that an audio signal is to be webcast with delivery of slides or presentations that are synchronized to speech included in the audio signal. It will be appreciated by one skilled in the art that the present invention is not limited to processing these three (3) audio webcast types. For example, in one embodiment, audio webcast types further include an "Audio/Visual" type that is associated with processing audio visual webcasts.

The calendar portion 304C includes a list of operators 304D assigned to scheduled webcasts over a particular time interval and a calendar 304E indicating a time frame during which a scheduled audio webcast is to occur. As shown in the FIG. 5 example, in one embodiment, each Operator identified in the list of operators is associated with a checkbox 304F. The checkbox 304F, upon selection by the Supervisor, enables the Supervisor to exclude one or more Operators from being automatically assigned to a webcast upon selection of the auto-allocate button 304B included in the webcast list portion 304A.

The chat portion 306 of the supervisor interface 300 provides a communication facility to communicate among Operators and Supervisors. As shown in the FIG. 5 example, in one embodiment, the chat portion 306 includes an operator list 306A of a team of Operators associated with a Supervisor and a chat window 306B for entering text to be communicated to one of the Operators or Supervisor. The Supervisor of the team may enter text in the chat window 306B, and upon selection of a send button (not shown), transmit the text to one or more of the Operators assigned to the Supervisor. As will be noted in connection with FIGS. 9-12, functionality provided by the chat portion 306 is not limited to the supervisor interface 300 and may be provided in other interfaces allowing Operators to communicate with a Supervisor or one or more other Operators.

As shown in the FIG. 5 example, the operator list 306A of the chat portion 306 includes a status field indicating a status of an operator, a number of live webcasts the operator is actively working on, and the amount of audio webcasts the Operator has processed since logging into the system. For example, the "3/5" entry shown is to be interpreted to mean that the Operator is currently producing three (3) live audio webcasts and has already produced five (5) on-demand versions (e.g., completed and edited) of webcasts.

In one embodiment, a set status option 306C is provided that allows a status associated with an Operator to be changed. Example Operator statuses may include, but are not limited to, "online"—indicating that the Operator is available to process an audio webcast, "offline"—indicating that the Operator is presently unavailable, "away"—indicating that the Operator is temporarily unavailable, and "Support needed"—indicating that the Operator is in need of technical assistance.

As shown in FIG. 5, a plurality of chat tabs 306D for differentiating communication with a plurality of Operators is provided. Each of the plurality of chat tabs 306D is associated with one of the plurality of Operators and may provide a visual cue when one Operator is communicating with a Supervisor. For example, in one embodiment, one of the chat tabs 306D associated with an Operator may blink when the Operator sends a message to the Supervisor using the chat window 306B.

Figure 6:
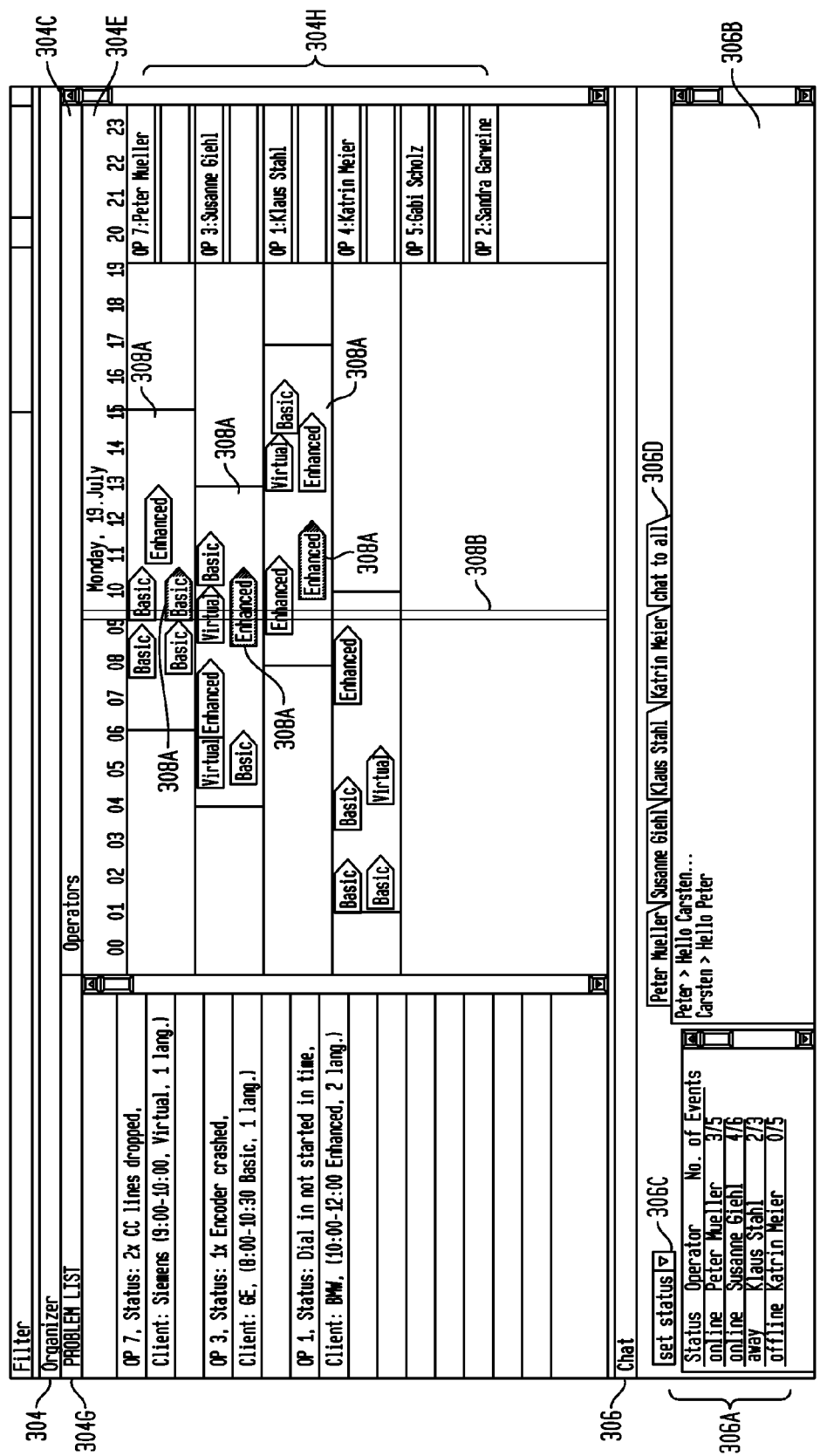
FIG. 6 illustrates an example supervisor interface in monitor mode.

Turning now to FIG. 6, an example of the supervisor interface 300 in the monitor mode is disclosed. The monitor mode of the supervisor interface 300 is typically utilized to monitor the status of scheduled audio webcasts. As shown in the FIG. 6 example, in the monitor mode, the webcast list portion 304A described in connection with FIG. 5 may not be displayed and the calendar 304E may be displayed along the full width of the interface. Upon the occurrence of a technical failure or technical impairment of one of more encoders, the monitor mode of the supervisor interface 300 displays a problem list 304G as shown in FIG. 6 and a list of operators 304H associated with problem audio webcasts. In one embodiment, the list of operators 304H is sorted according to problem type. The problem list 304G may be ordered by severity level and/or linked to a service level specified in a service level agreement (SLA).

Alarm functionality may also be provided in the event of a technical failure or impairment associated with an audio webcast. In one embodiment, an alarm is displayed as an error message in the problem list 304G adjacent an Operator name assigned to the audio webcast. Advantageously, the Supervisor then may communicate a suggestion to the appropriate Operator if assistance is needed, as well as determine the impact of the technical failure or impairment.

In one embodiment, if a webcast loses a connection to an encoder or to a main or backup signal line into a conference call, the webcast is displayed in the calendar 304E blinking in a red color 308A. If the webcast loses the main or backup connection to the call or the audio signal differs between the main and backup connections, the webcast may be displayed in the calendar 304E blinking in a yellow color. In one embodiment, if the transcoding process is not finished properly, the webcast may be displayed in the calendar 304E blinking in a blue color. In one embodiment, five (5) minutes before the actual end of an audio webcast, the webcast is displayed in the calendar 304E blinking in a green color. Further, in one embodiment, if a webcast provides no audio signal for longer than ten (10) seconds but all connections are established properly, the webcast is displayed in the calendar 304E blinking in a black color. Of course it will be appreciated by one skilled in the art that the present invention is not limited to the above-described visual cues and that other techniques may be utilized to provide alarm functionality concerning webcasts.

Further, to facilitate time identification of a technical failure or impairment, in one embodiment, a time marker 308B is provided as part of the calendar 304E that moves through the calendar 304E in real time as time elapses.

Figure 7:
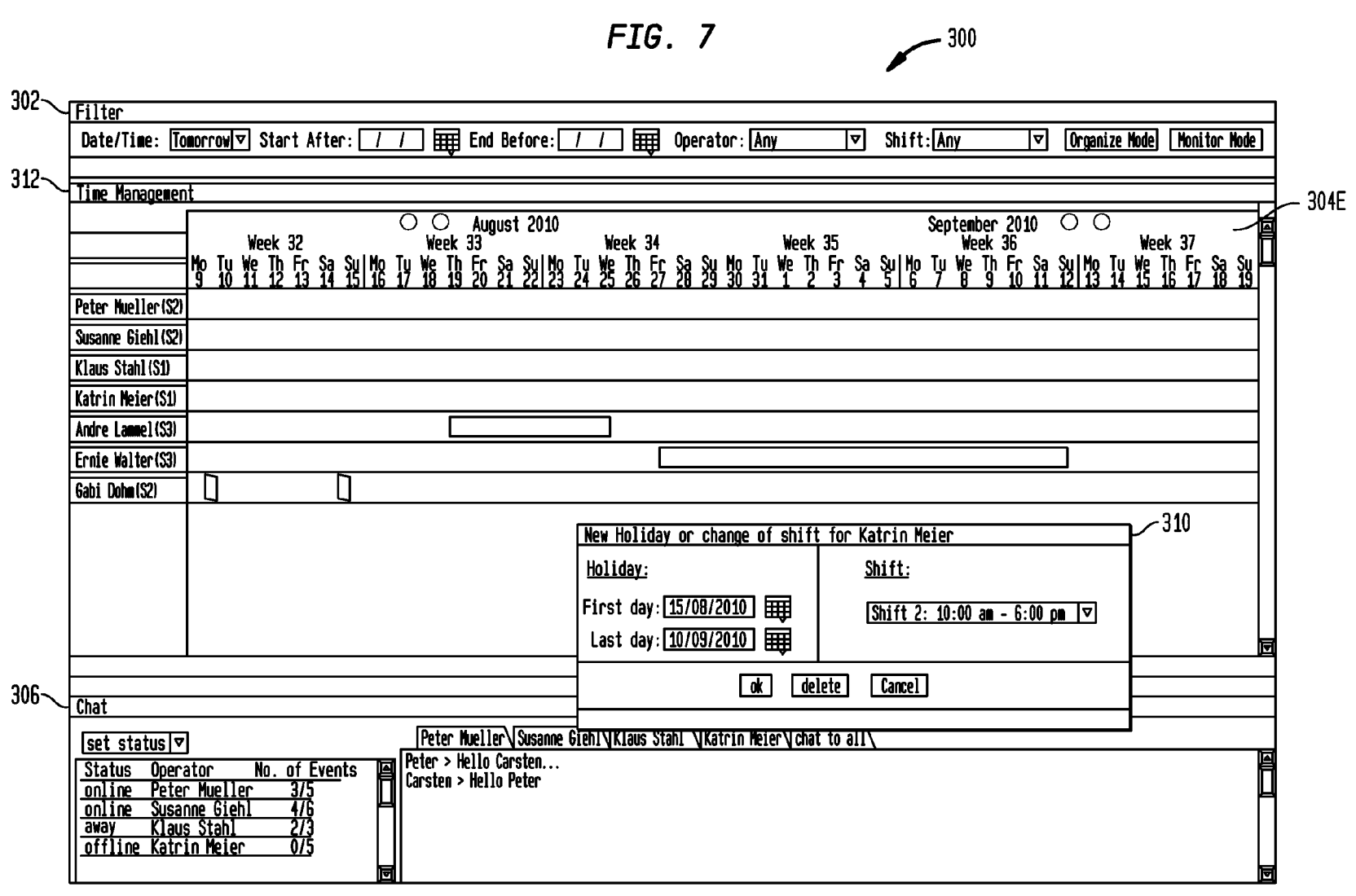

FIG. 7 illustrates an example supervisor interface 300 in time management mode. In one embodiment, a time management portion 312 is provided in the interface 300 that allows a supervisor to track attendance of Operator team members and may be utilized to enter absences of Operators in the system. For example, as shown in FIG. 7, in one embodiment, a pop-up window 310 is provided as part of the time management portion 312 that allows the Supervisor to specify either a holiday or shift change for an Operator. Advantageously, the time management mode provides a solution to organize a team of Operators that can process audio webcasts scheduled over a certain time frame.

In one embodiment, the system arranges Operator teams and corresponding Supervisors according to a rule specifying that each Supervisor may monitor a team of up to twelve (12) Operators. Teams may be determined by the system dynamically for one or more Operator shifts.

FIG. 8 illustrates a detailed day view available in the time management mode of the interface 300. According to one embodiment, in the detailed view, a Supervisor may be provided a breakdown of scheduled webcast times in fifteen (15) minute time intervals which may facilitate in informing the Supervisor whether an adequate number of Operators are available to process scheduled webcasts.

As shown in the FIG. 8 example, in one embodiment, the detail day view may provide metrics to the Supervisor indicating the number of starting webcasts, a number of running (e.g., live) webcasts, a number of ending webcasts, a number of operators needed to process scheduled webcasts, a number of available Operators to process webcasts, and overcapacity of Operators, in fifteen (15) minute time intervals.

Various embodiments of the supervisor interface 300 also include reporting functionality. For example, in one embodiment, statistics are provided by the interface 300 that include, but are not limited to, delivered webcasts by Operator per week, month, quarter, year, average working time by Operator per webcast, and webcast type, total working time by Operator, total holidays taken by Operator, processed webcast types by Operator per week, month, quarter, year, processed webcasts by Team per week, month, quarter, year, and technical failures or impairments encountered by Operator and/or client per week, month, quarter, and year.

FIGS. 9-12 illustrate an example operator interface 400 provided by the NOC user interface. The operator interface 400 allows one or more Operators to dial into telephone conferences and to connect to virtual encoders for producing data streams. In one embodiment, the operator interface 400 includes functionality to record and finalize data streams associated with webcasts for transmission to the CDN. As shown and described in connection with FIGS. 9-12, in one embodiment, the operator interface 400 includes a webcast list portion 410, a chat portion 422, and an event area comprising one or more work portions 442A-E.

Figure 9:
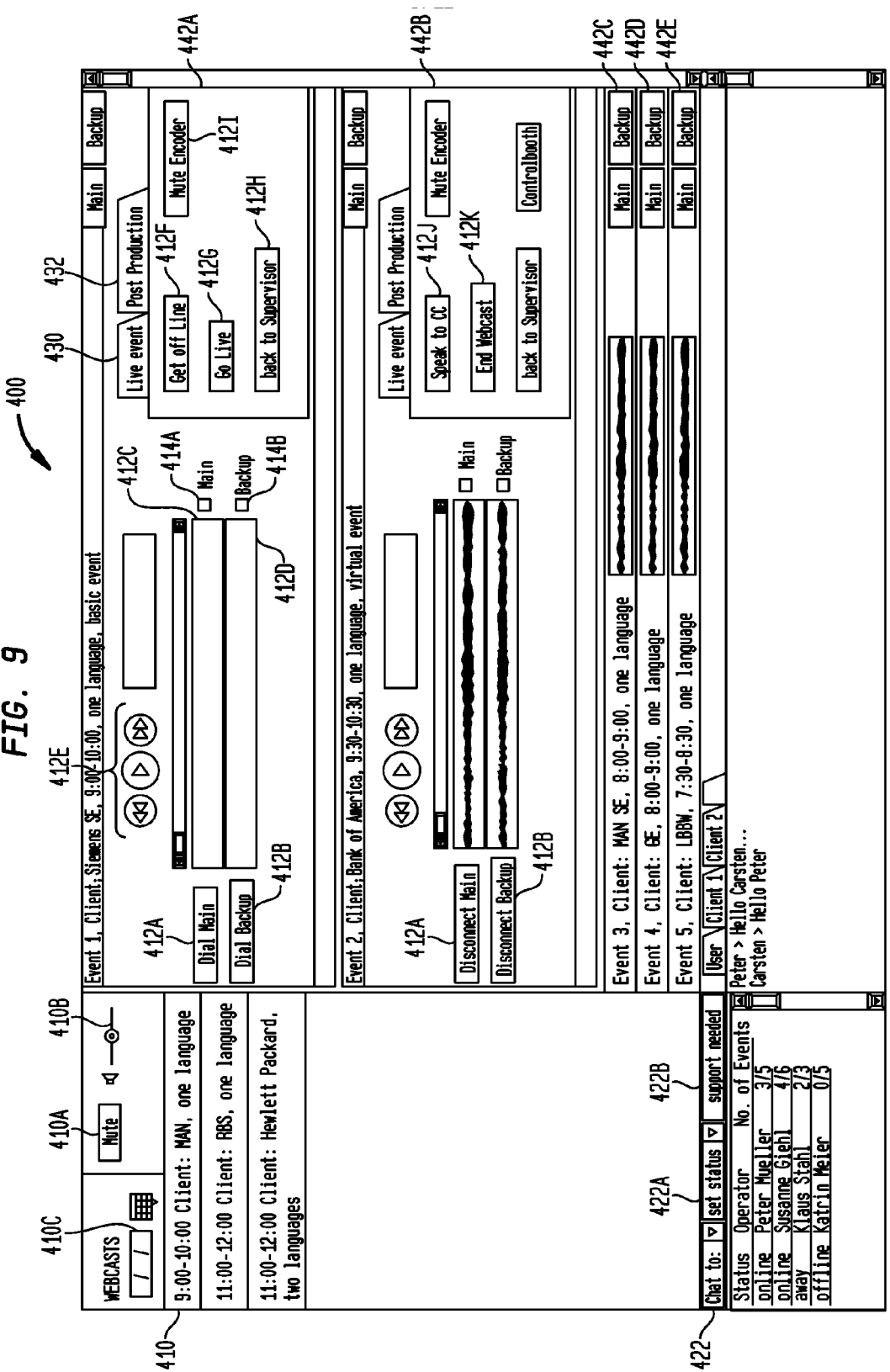
FIG. 9 illustrates an example operator interface prior to dialing a webcast.

FIG. 9 illustrates an example of the operator interface 400 prior to dialing into a scheduled webcast. As shown in FIG. 9, the webcast list portion 410 displays all the scheduled webcasts that an Operator is assigned for an actual work day. In one embodiment, webcasts displayed in the webcast list portion 410 may be moved with drag and drop functionality into one of the work portions 442A-E described below. As shown in the FIG. 9 example, the webcast list portion 410 may include a slider 410B that controls a change in audio level for an Operator headset, and a mute button 410A that once selected, causes the system to mute audio channels providing sound to the Operator headset. Selectable date criteria 410C may also be provided allowing an Operator to query for scheduled webcasts on dates in which the Operator is assigned.

The chat portion 422 of the operator interface 400 includes functionality similar to the chat portion 306 discussed in connection with FIGS. 5-8. For example, in one embodiment, the chat portion 422 includes a set status pull-down option 422A that allows the Operator to change his/her status, as described previously. In one embodiment, the chat portion 422 also includes a support-needed button 422B that once selected, changes the status of the Operator in the chat portion 422 and transmits a message to the Supervisor of the Operator that assistance is needed.

The work area of the operator interface 400 is where an Operator processes scheduled audio webcasts. In one embodiment, one or more of the work portions 442A-E of the work area may be expanded and collapsed, thus providing an Operator with the ability to utilize screen space in the interface 400 as desired.

Each work portion 442A-E of the work area may be associated with a scheduled webcast and includes a title indicating a client name, scheduled time, and audio webcast type associated with the webcast. For example, as shown in FIG. 9, the first audio webcast 442A includes the following title: "Event 1, Client: Siemens SE, 9:00-10:00, one language, basic event".

As shown in FIGS. 9-12, each work portion 442A-E may include a dial main button 412A and a dial backup button 412B. In one embodiment, upon a first selection of the dial main button 412A, the system establishes a connection to a main encoder associated with the webcast and changes the label associated with the dial main button 412A from "Dial Main" to "Disconnect Main." Upon a second selection of the dial main button 412A, the system disestablishes the connection to the main encoder associated with the webcast and changes the label from "Disconnect Main" to "Dial Main." Likewise, upon a first selection of the dial backup button 412B, the system establishes a connection to a backup encoder associated with the webcast and changes the label associated with the dial backup button 412B from "Dial Backup" to "Disconnect Backup." Upon a second selection of the dial backup button 412B, the system disestablishes the connection to the backup encoder associated with the webcast and changes the label associated with the dial backup button from "Disconnect Backup" to "Dial Backup."

Work portions 442A-E also may include a webcast player 412E for receiving, playing, and recording audio signals associated with webcasts. A main display area 412C for displaying in wave form an audio signal received the main encoder, and a backup display area 412D for displaying a wave form of an audio signal received from the backup encoder may also be provided. In one embodiment, as shown in FIGS. 9-11, main and backup checkboxes 414A, 414B are provided that, upon selection by an Operator, indicate which encoder communication line (e.g., main or backup) is to be muted to permit communication with a Conference Call Operator.

As shown in FIGS. 9-12, in one embodiment, one or more work portions 442A-E include a live-event tab 430 and a post-production tab 432. Selectable options provided under the live-event tab 430 may be utilized by an Operator prior to and during a webcast. Selectable options provided under the post-production tab 432 may be utilized by the Operator once a webcast is finished. Details of selectable options provided under the live-event tab 430 and post-production tab 432 are discussed below.

Figure 10:
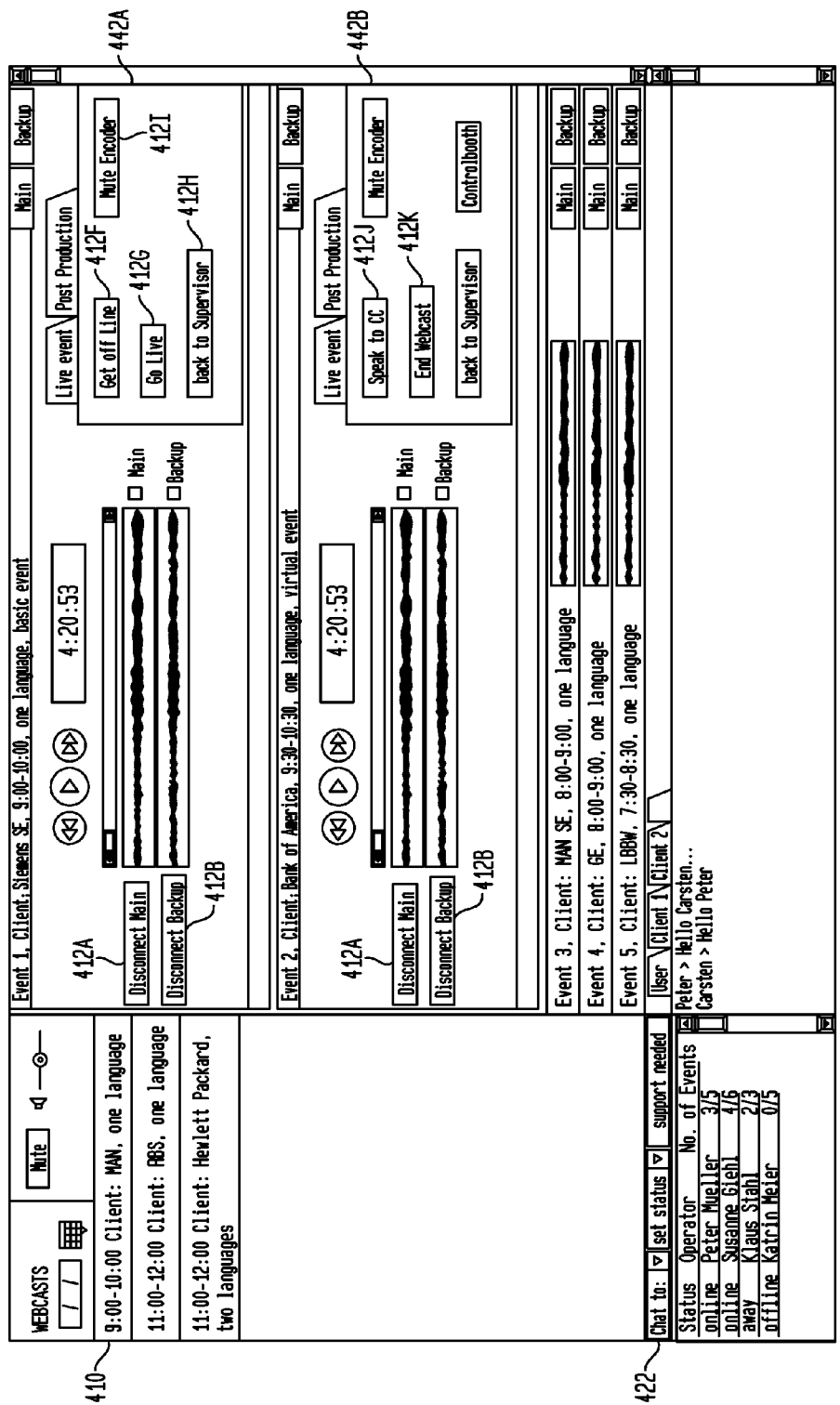
FIG. 10 illustrates an example operator interface after dialing a webcast.
Figure 11:
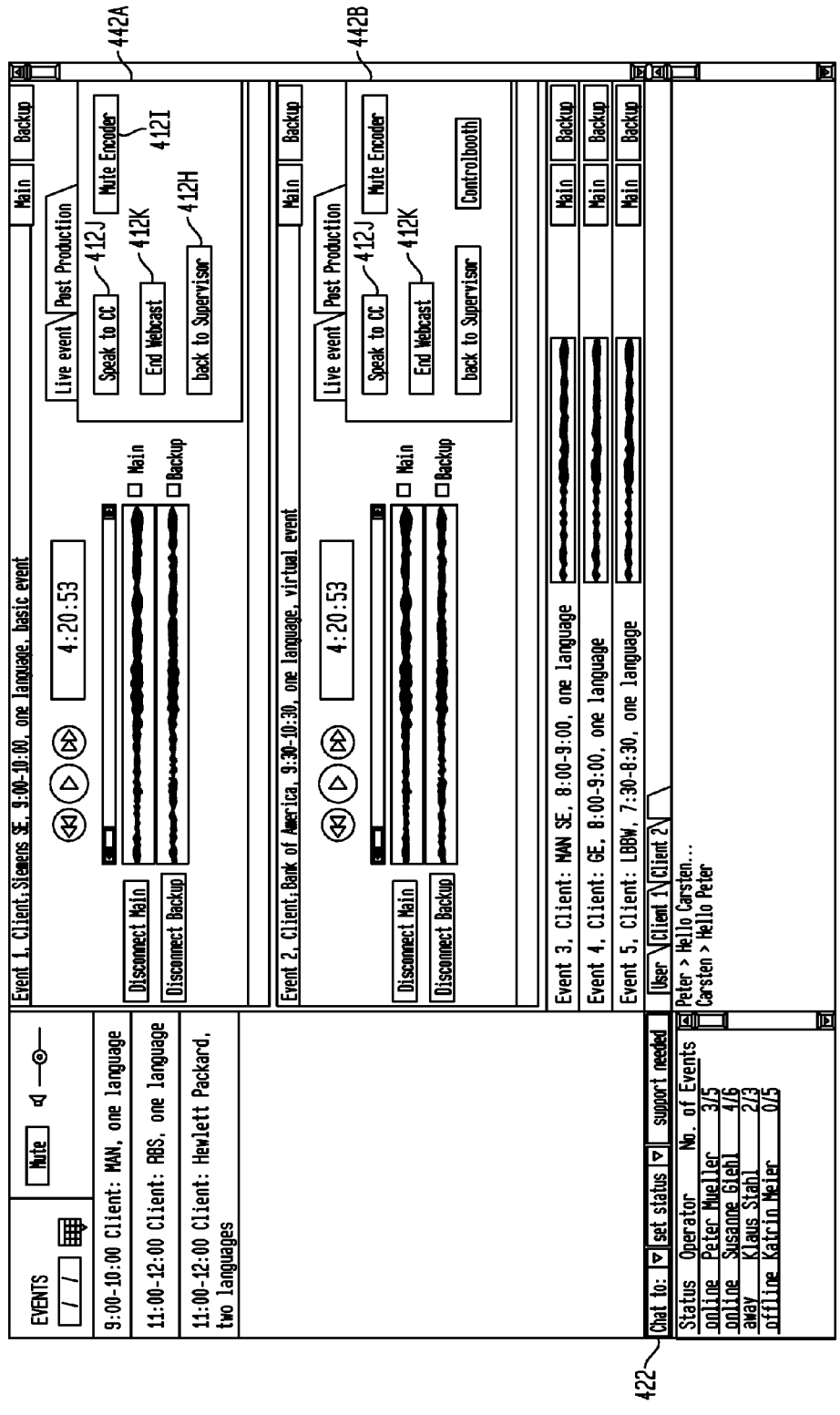
FIG. 11 illustrates an example operator interface during a live webcast.

FIGS. 9 and 10 illustrate selectable options of the live event tab 430 in different states and more specifically, selectable options available under the live event tab 430 of the work portion 442A prior to dialing into a webcast and after dialing into the webcast, respectively. FIG. 11 illustrates selectable options available under the live-event tab 430 during a live audio webcast.

In one embodiment, as shown in FIGS. 9-10, the live-event tab 430 may include a get-off-line button 412F that, once selected, removes the Operator from an active webcast once a connection between an audio source and encoders is established, and a go-live button 412G that, once selected, causes the system to activate one or more encoders to process audio signals associated with the webcast. The live-event tab 420 may also include a back-to-supervisor button 412H that once selected, transfers the webcast assigned to the Operator back to the Supervisor, who may then reassign the webcast for processing or finalizing. In one embodiment, a mute encoder button 412I is also provided that once selected, causes the system to mute the audio signal received from both communication lines on the encoders. Advantageously, the mute encoder button 412I may be utilized by the Operator in emergency cases or for special requirements of a client.

FIG. 11 discloses selectable options available to the Operator under the live-event tab 430 during an active (e.g., live) audio webcast. As shown in the FIG. 11 example, referring to the example work portion 442A, a speak button 412J is provided that once selected, causes the system to open a communication line to speak with a Conference Call Operator associated with the live webcast, and an end-webcast button 412K that once selected, causes the system to activate the post-production tab 432 and disconnect any PSTN connection to the Conference Call center.

Figure 12:
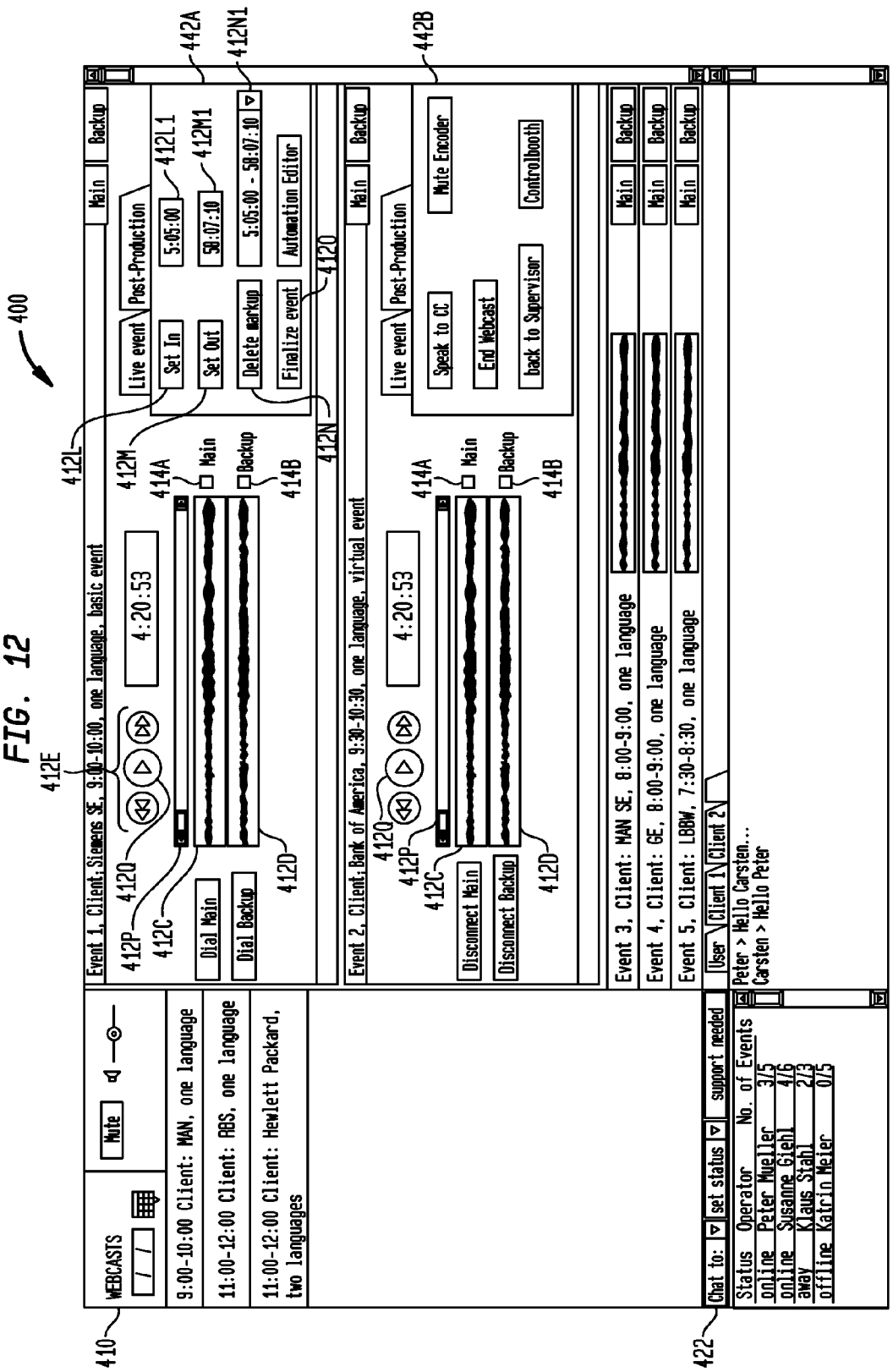
FIG. 12 illustrates an example operator interface in post webcast production.

FIG. 12 illustrates selectable options available under the post-production tab 432 upon selection of the end-webcast button 412K. The selectable options may be utilized by the Operator to finalize data stream recordings for transmission to the CDN, which may then be made available on demand.

As shown in FIG. 12, in one embodiment referring to the example work portion 442A, selectable options under the post-production tab 432 include a set-in button 412L and associated set-in display 412L1, a set-out button 412M and associated set-out display 412M1, a delete-markup button 412N, a markup list 412N1, and a finalize-event button 412O.

The set-in button 412L, once selected, identifies a start point of the webcast in a wave form recording displayed in either the main display area 412C or the backup display area 412D, and displays a time location associated with the identified start point in the associated set-in display 412L1. In operation, the Operator typically first selects either the main checkbox 414A or the backup checkbox 414B to identify which recorded stream is to be used, and then listens to the identified recorded stream to determine the start point. In one embodiment, the Operator scrolls to an estimated beginning of the webcast using a provided audio slider 412P, selects a 'play' control 412Q on the provided player 412E, and then selects the set-in button 412L once the starting point of the webcast is reached. In another embodiment, rather than using the audio slider 412P, the Operator uses controls, such as a fast forward control and reverse control, included in the provided player 412E to scroll to the estimated beginning of the webcast.

The set-out button 412M, once selected, identifies an end point of the webcast in the wave form recording selected for use with the set-in button 412L, and displays a time location associated with the identified end point in the associated set-in display 412L1. In one embodiment, similar to selection of the start point, the Operator scrolls to an estimated ending of the webcast using the provided audio slider 412P, selects a 'play' control 412Q of the provided player 412E, and then selects the set-out button 412M once the ending point of the webcast is reached. In another embodiment, rather than using the audio slider 412P, the Operator uses controls, such as a fast forward control and reverse control, included in the provided player 412E to scroll to the estimated ending of the webcast.

In one embodiment, identified start points and end points of a webcast are associated together to form markups, which may be shown in the markup list 412H1 displayed to the Operator, that are used by the system to cut and edit the recorded wave form to generate an on-demand version of the webcast. In one embodiment, markups shown in the markup list 412H1 are user selectable. Upon selection of one of one of the markups and selection of the delete-markup button 412N, the selected markup is deleted from the system.

The finalize-event button 412O, once selected, initiates the transcoding of the webcast and produces the on demand version of the webcast using one or more specified markups. In one embodiment, in the event multiple markups are specified for a webcast, the system cuts portions of the webcast that are not between markup start points and end points to form the on-demand version of the webcast.

In one embodiment, progress of the transcoding process is displayed to the Operator and/or Supervisor with a progress bar including an estimated time for the transcoding to be completed. If the transcoding process completes without any failures, in one embodiment, the webcast is automatically removed from the work area of the operator interface 400 and is grayed out in the monitor mode of the supervisor interface 300.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system comprising:
   a first user interface implemented using a cloud computing environment including one or more processors and configured to manage a set of multiple scheduled webcasts; and
   a second user interface implemented using the cloud computing environment and configured to initiate at least one scheduled webcast from the set of multiple scheduled webcasts using at least one virtual machine instantiated in the cloud computing environment,
   wherein the at least one virtual machine is configured to:
      encode a digital data stream associated with the initiated scheduled webcast and encoded in a first encoding protocol to a second encoding protocol, and
      transmit the encoded digital data stream in the second encoded protocol to a content distribution network, and
   a second virtual machine in the cloud computing environment configured to receive the digital data stream encoded according to the first encoding protocol, and when an event affects a performance of the at least one virtual machine, the second virtual machine is configured to encode the digital data stream to generate an encoded digital data stream, the encoding being done according to the second encoding protocol,
   wherein the second virtual machine is configured to transmit the encoded data stream from the second virtual machine to the content distribution network.

2. The system of claim 1, wherein the first user interface is configured to manage a calendar of dates and times associated with the set of multiple scheduled audio webcasts.

3. The system of claim 2, wherein the first user interface includes a filter portion to search for one of the set of multiple scheduled webcasts and arrange the set of multiple scheduled webcasts in the calendar based on a set of assigned dates and times.

4. The system of claim 2, wherein the first user interface includes an organizer portion comprising a webcast list portion and an operator portion.

5. The system of claim 4, wherein the webcast list portion identifies a start and end time of each one of the set of multiple scheduled webcasts and a client identifier associated with each one of the set of multiple scheduled webcasts.

6. The system of claim 5, wherein the webcast list portion includes an assign button that, once selected, causes an automatic allocation of one of the scheduled webcasts to one of a plurality of webcast operators.

7. The system of claim 4, wherein the operator portion identifies, in real time, at least one of a technical failure or technical impairment associated with one of the set of multiple scheduled webcasts in progress.

8. The system of claim 2, wherein the first user interface comprises a chat portion allowing a communication to at least one of a plurality of webcast operators.

9. The system of claim 2, wherein the first user interface is configured to provide a schedule control for rescheduling at least one of the set of multiple scheduled audio webcasts from a first time interval to a second time interval, the first time interval different from the second time interval.

10. The system of claim 2, wherein the first user interface is configured to identify a plurality of webcast operators associated with the set of multiple scheduled webcasts.

11. The system of claim 10, wherein the first user interface is configured to identify the plurality of webcast operators available to be assigned to the at least one scheduled webcast.

12. The system of claim 11, wherein one of the plurality of webcast operators is assigned to the at least one scheduled webcast in response to selection of one of the plurality of webcast operators from the first user interface.

13. The system of claim 1, wherein the second user interface includes a webcast list portion, an event portion, and a chat portion.

14. The system of claim 13, wherein the webcast list portion identifies a start and end time of each one of the set of multiple scheduled webcasts assigned to one of a plurality of webcast operators.

15. The system of claim 13, wherein the event portion comprises a work event area associated with each of the set of multiple scheduled webcasts identified in the webcast list portion.

16. The system of claim 15, wherein each work event area comprises webcast controls for instantiating and monitoring each of the set of multiple scheduled webcasts.

17. The system of claim 16, wherein a first control of the webcast controls, upon selection, instantiates a first connection with a first encoder and a second control of the webcast controls, upon selection, instantiates a second connection with a second encoder, the first encoder encoding the digital stream in the second protocol and the second encoder encoding the digital stream in the second protocol.

18. The system of claim 17, wherein the first control of the webcast controls, upon selection, disconnects the first connection from the first encoder.

19. The system of claim 17, wherein the second control of the webcast controls, upon selection, disconnects the second connection from the second encoder.

20. The system of claim 17, wherein the work event area includes a first display associated with the encoded digital stream provided by the first encoder and a second display associated with the encoded digital stream provided by the second encoder.

21. The system of claim 17, wherein one of the webcast controls, upon selection, mutes at least one of the first encoder and the second encoder.

22. The system of claim 17, wherein one of the webcast controls, upon selection, allows for communication with a conference call operator.

23. The system of claim 16, wherein one of the webcast audio controls, upon selection, reassigns a webcast from the set of multiple scheduled webcasts from an operator to a supervisor.

24. The system of claim 16, wherein one of the webcast controls, upon selection, terminates one of the set of multiple scheduled webcasts.

25. The system of claim 16, wherein one of the webcast controls, upon selection, finalizes a recording of the one of the multiple scheduled webcasts for transmission to the content distribution network.

26. The system of claim 25, wherein at least one of the webcast controls, upon selection, sets a starting location and an ending location in the recording for removing a portion of the webcast.

27. The system of claim 13, wherein the second user interface comprises a chat portion allowing for communication to at least one of a plurality of webcast operators.

28. The system of claim 1, wherein each of the set of multiple scheduled webcasts is associated with an event type selected from the group consisting essentially of "Basic Event", "Enhanced Event", and "Virtual Event".

29. A method of providing webcasts comprising:
managing, by a first user interface implemented using a cloud computing environment including one or more processors, a set of multiple scheduled webcasts;
initiating, by a second user interface implemented using the cloud computing environment, at least one scheduled webcast from the set of multiple scheduled webcasts using at least one virtual machine instantiated in the cloud computing environment;
encoding, at the at least one virtual machine, a digital data stream associated with the initiated scheduled webcast and encoded in a first encoding protocol to a second encoding protocol; and
transmitting, from the at least one virtual machine, the encoded digital data stream in the second encoded protocol to a content distribution network;
receiving at a second virtual machine in the cloud computing environment the digital data stream encoded according to the first encoding protocol,
encoding, by the second virtual machine, the digital data stream according to the second encoding protocol to generate an encoded digital data stream when an event affects a performance of the at least one virtual machine, and
transmitting the encoded data stream from the second virtual machine to the content distribution network.

30. The method of claim 29, wherein the managing include managing a calendar of dates and times associated with the set of multiple scheduled webcasts.

31. The method of claim 30, comprising providing a filter portion of the first user interface for searching for one of the set of multiple scheduled webcasts and arranging the set of scheduled webcasts in the calendar based on a set of assigned dates and times.

32. The method of claim 30, wherein the first user interface includes an organizer portion comprising a webcast list portion and an operator portion.

33. The method of claim 32, comprising displaying a start and end time of each one of the set of multiple scheduled webcasts and a client identifier associated with each one of the set of scheduled webcasts in the webcast list portion.

34. The method of claim 33, comprising automatically assigning one of the multiple scheduled webcasts to one of a plurality of webcast operators in response to a selection of an assign button included in the webcast list portion.

35. The method of claim 32, comprising displaying, in real time, at least one of a technical failure or technical impairment associated with one of the set of multiple scheduled webcasts in progress in the operator portion.

36. The method of claim 30, comprising providing a chat portion of the first user interface, the chat portion allowing a communication to at least one of a plurality of webcast operators.

37. The method of claim 30, comprising providing a schedule control included in the first user interface for rescheduling at least one of the set of multiple scheduled webcasts from a first time interval to a second time interval, the first time interval different from the second time interval.

38. The method of claim 30, comprising displaying, in the first user interface, a plurality of webcast operators associated with the set of multiple scheduled webcasts.

39. The method of claim 38, comprising displaying, in the first user interface, the plurality of webcast operators available to be assigned to the at least one scheduled webcast.

40. The method of claim 39, comprising assigning one of the plurality of webcast operators to the at least one scheduled audio webcast in response to selection of one of the plurality of webcast operators from the first interface.

41. The method of claim 29, wherein initiating the at least one scheduled audio webcast comprises providing a second user interface, the second user interface comprising a webcast list portion, an event portion, and a chat portion.

42. The method of claim 41, comprising displaying a start and end time of each one of the set of multiple scheduled webcasts assigned to one of a plurality of webcast operators in the webcast list portion.

43. The method of claim 41, wherein the event portion comprises a work event area associated with each of the set of multiple scheduled webcasts identified in the webcast list portion.

44. The method of claim 43, comprising providing webcast controls in each work event area for instantiating and monitoring each of the set of scheduled webcasts.

45. The method of claim 44, comprising: instantiating a first connection with a first encoder in response to a selection of a first control of the webcast controls and; instantiating a second connection with a second encoder in response to a selection of a second control of the webcast controls, the first encoder encoding the digital stream in the second protocol and the second encoder encoding the digital stream in the second protocol.

46. The method of claim 45, comprising disconnecting the first connection from the first encoder upon selection of the first control of the webcast controls.

47. The method of claim 45, comprising disconnecting the second connection from the second encoder upon selection of the second control of the webcast controls, the second control different from the first control.

48. The method of claim 45, comprising providing in the work event area a first audio display associated with the encoded digital stream provided by the first encoder and a second audio display associated with the encoded digital stream provided by the second encoder.

49. The method of claim 45, comprising muting at least one of the first encoder and the second encoder upon selection of one of the webcast controls.

50. The method of claim 45, comprising providing communication with a conference call operator upon selection of one of the webcast controls.

51. The method of claim 44, comprising reassigning an audio webcast from the set of scheduled webcasts from an operator to a supervisor upon selection of one of the webcast controls.

52. The method of claim 44, comprising terminating one of the set of scheduled webcasts upon selection of one of the webcast controls.

53. The method of claim 44, comprising finalizing a recording of the one of the multiple scheduled webcasts for transmission to the content distribution network upon selection of one of the webcast controls.

54. The method of claim 53, comprising setting a starting location and an ending location in the recording for removing a portion of webcast upon selection of at least one of the webcast audio controls.

55. The method of claim 41, comprising providing a chat portion for allowing communication to at least one of a plurality of webcast operators.

56. The method of claim 29, wherein each of the set of multiple scheduled webcasts is associated with an event type selected from the group consisting essentially of "Basic Event", "Enhanced Event", and "Virtual Event".

57. The method of claim 29, further comprising:
receiving the digital data stream encoded according to the first encoding protocol at a second virtual machine in the cloud computing environment, and when an event affects a performance of the at least one virtual machine, encoding the digital data stream on the second virtual machine to generate an encoded digital data stream, the encoding being done according to the second encoding protocol, and transmitting the encoded data stream from the second virtual machine to the content distribution network.

58. The method in claim 29, wherein the first and second user interfaces are distributed across multiple virtual machines and implement data replication to ensure that each of the multiple virtual machines can assume the encoding and transmitting.

59. The system of claim 1, wherein the first and second user interfaces are distributed across multiple virtual machines sharing a same domain name server (DNS).

60. The system in claim 1, wherein the first and second user interfaces are distributed across multiple virtual machines and implement data replication to ensure that each of the multiple virtual machines can assume the encoding and transmitting.

* * * * *